US 10,460,466 B2

United States Patent
Oguro et al.

(10) Patent No.: US 10,460,466 B2
(45) Date of Patent: Oct. 29, 2019

(54) LINE-OF-SIGHT MEASUREMENT SYSTEM, LINE-OF-SIGHT MEASUREMENT METHOD AND PROGRAM THEREOF

(71) Applicant: TOPPAN PRINTING CO., LTD., Taito-ku (JP)

(72) Inventors: Hisashi Oguro, Taito-ku (JP); Keisuke Kishi, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 15/393,325

(22) Filed: Dec. 29, 2016

(65) Prior Publication Data

US 2017/0109897 A1   Apr. 20, 2017

Related U.S. Application Data

(63) Continuation of application No. PCT/JP2015/068522, filed on Jun. 26, 2015.

(30) Foreign Application Priority Data

Jun. 30, 2014 (JP) .................................. 2014-133919

(51) Int. Cl.
G06T 7/70 (2017.01)
G06T 7/60 (2017.01)
(Continued)

(52) U.S. Cl.
CPC .............. *G06T 7/70* (2017.01); *G06F 3/013* (2013.01); *G06F 3/0346* (2013.01); *G06T 7/60* (2013.01); *G06T 11/60* (2013.01); *H04N 13/243* (2018.05)

(58) Field of Classification Search
CPC ........ G06F 1/163; G06F 3/013; G06F 3/0346; G06T 11/60; G06T 7/60; G06T 7/70; H04N 13/0242
See application file for complete search history.

(56) References Cited

U.S. PATENT DOCUMENTS 5,636,334 A * 6/1997 Hidaka .................. G06T 15/00
 345/419
9,728,006 B2 * 8/2017 Varga .................... G06T 19/006
(Continued)

FOREIGN PATENT DOCUMENTS

JP 06-189906 A 7/1994
JP 11-276438 A 10/1999
(Continued)

OTHER PUBLICATIONS

Andrew Duchowski et al., "3-D eye movement analysis", Behavior Research Methods, Instruments, & Computers, pub. 2002, pp. 573-591.*

(Continued)

*Primary Examiner* — Mekonen T Bekele
(74) *Attorney, Agent, or Firm* — Oblon, McClelland, Maier & Neustadt, L.L.P.

(57) ABSTRACT

A system of measuring a line-of-sight of an observer including an user imaging unit which is wearable by an observer of an object in a display space and captures a field view image in front of the observer, an user measurement unit which is wearable by the observer and obtains line-of-sight measurement data showing a line-of-sight direction of the observer relative to a coordinate system of the field view image, and a line-of-sight measurement apparatus which obtains a gaze point of the observer based on a coordinate position where 3D shape data of the display space including the object intersect a vector of the line-of-sight direction of the observer.

16 Claims, 11 Drawing Sheets

(51) Int. Cl.
  *G06F 3/0346* (2013.01)
  *H04N 13/243* (2018.01)
  *G06F 3/01* (2006.01)
  *G06T 11/60* (2006.01)

(56) References Cited

U.S. PATENT DOCUMENTS

| | | | | |
|---|---|---|---|---|
| 9,996,151 | B2* | 6/2018 | Iwasaki | G06F 3/013 |
| 10,007,351 | B2* | 6/2018 | Nagai | G02B 27/017 |
| 2004/0189935 | A1* | 9/2004 | Warden | G02C 7/027 |
| | | | | 351/204 |
| 2004/0246496 | A1* | 12/2004 | Yoshida | G01B 11/2527 |
| | | | | 356/605 |
| 2008/0319835 | A1 | 12/2008 | Tsuji | |
| 2009/0021693 | A1* | 1/2009 | Sessner | G02C 13/005 |
| | | | | 351/204 |
| 2010/0053555 | A1 | 3/2010 | Enriquez et al. | |
| 2011/0007269 | A1* | 1/2011 | Trumm | G02C 13/005 |
| | | | | 351/204 |
| 2011/0102549 | A1* | 5/2011 | Takahashi | A61C 1/084 |
| | | | | 348/46 |
| 2011/0157549 | A1* | 6/2011 | Wada | A61B 3/024 |
| | | | | 351/204 |
| 2011/0222019 | A1* | 9/2011 | Suzuki | G02C 7/024 |
| | | | | 351/159.42 |
| 2011/0242486 | A1* | 10/2011 | Ebisawa | G06F 3/013 |
| | | | | 351/206 |
| 2013/0162632 | A1* | 6/2013 | Varga | G06T 19/006 |
| | | | | 345/419 |
| 2014/0240313 | A1* | 8/2014 | Varga | G06T 19/006 |
| | | | | 345/419 |
| 2015/0286070 | A1 | 10/2015 | Aikawa | |
| 2016/0018897 | A1* | 1/2016 | Nagai | G02B 27/017 |
| | | | | 345/156 |
| 2016/0147301 | A1* | 5/2016 | Iwasaki | G06F 3/013 |
| 2016/0202947 | A1* | 7/2016 | Ramalingam | G02B 27/017 |
| | | | | 345/156 |
| 2016/0217578 | A1* | 7/2016 | Can | G01V 3/12 |
| 2017/0200316 | A1* | 7/2017 | Giordano | G06F 3/012 |
| 2019/0011983 | A1* | 1/2019 | Yasuda | G06F 3/01 |

FOREIGN PATENT DOCUMENTS

| | | |
|---|---|---|
| JP | 2009-3701 A | 1/2009 |
| JP | 2012-146199 A | 8/2012 |
| WO | WO 2014/046206 A1 | 3/2014 |

OTHER PUBLICATIONS

Extended European Search Report dated Nov. 10, 2017 in Patent Application No. 15814153.1.
Kentaro Takemura, et al. "Estimating 3D Point-of-regard and Visualizing Gaze Trajectories under Natural Head Movements", Proceedings of the 2010 Symposium on Eye Tracking Research & Applications, ETRA '10, ACM Press, XP058123557, 2010, pp. 157-160.
International Search Report dated Sep. 8, 2015 in PCT/JP2015/068522, filed Jun. 26, 2015.

* cited by examiner

FIG.3A

| MULTIPLE-VIEWPOINT CAPTURED IMAGE IDENTIFICATION INFORMATION | CAPTURED IMAGE ADDRESS | FEATURE POINT DATA | CAMERA CAPTURED IMAGE | CAMERA CAPTURED IMAGE DIRECTION VECTOR | CAMERA ATTITUDE ANGLE | IMAGE PROJECTION CONVERSION MATRIX |
|---|---|---|---|---|---|---|
| MULTIPLE-VIEWPOINT CAPTURED IMAGE 1 | ****** | ****** | ****** | ***** | ***** | ***** |
| MULTIPLE-VIEWPOINT CAPTURED IMAGE 2 | ****** | ****** | ****** | ***** | ***** | ***** |
| MULTIPLE-VIEWPOINT CAPTURED IMAGE 3 | ****** | ****** | ****** | ***** | ***** | ***** |
| ........ | ........ | ........ | ........ | ........ | ........ | ........ |

FIG.3B

| CAPTURED IMAGE IDENTIFICATION INFORMATION | CAPTURED IMAGE ADDRESS | FEATURE POINT DATA | CAMERA CAPTURED IMAGE | CAMERA CAPTURED IMAGE DIRECTION VECTOR | CAMERA ATTITUDE ANGLE | CAPTURED TIME | CAMERA COORDINATE CONVERSION MATRIX |
|---|---|---|---|---|---|---|---|
| FRAME IMAGE 1 | ***** | ****** | ****** | ***** | ***** | ***** | ***** |
| FRAME IMAGE 2 | ****** | ****** | ****** | ***** | ****** | ***** | ***** |
| FRAME IMAGE 3 | ****** | ***** | ***** | ***** | ***** | ***** | ***** |
| ........ | ........ | ........ | ........ | ........ | ........ | ........ | ........ |

FIG.4

| CAPTURED IMAGE IDENTIFICATION INFORMATION | CAPTURED IMAGE ADDRESS | LINE-OF-SIGHT DIRECTION VECTOR | CAPTURED TIME |
|---|---|---|---|
| ****** | ***** | ***** | ***** |
| ****** | ***** | ***** | ***** |
| ****** | ***** | ***** | ***** |
| ⋮ | ⋮ | ⋮ | ⋮ |

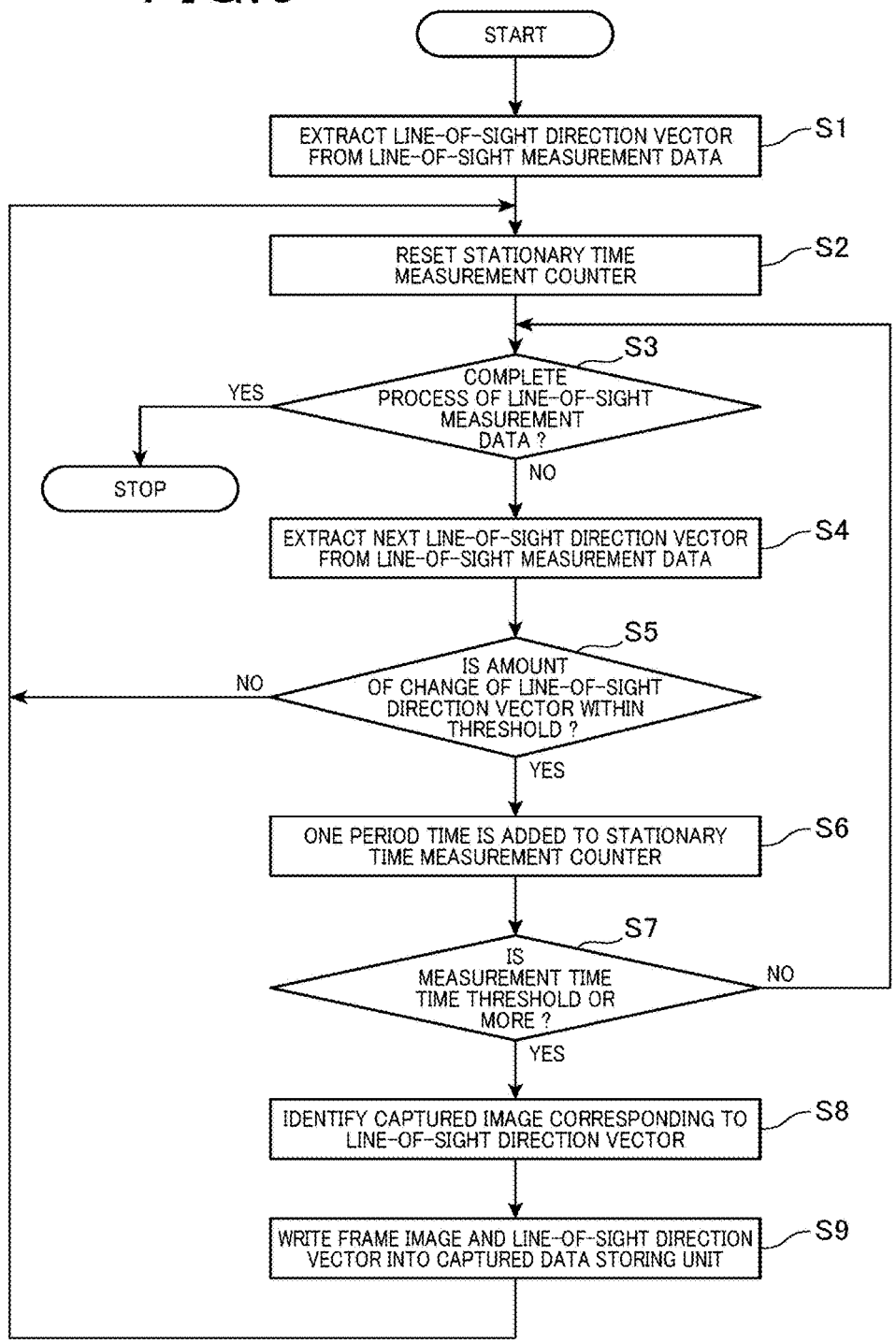

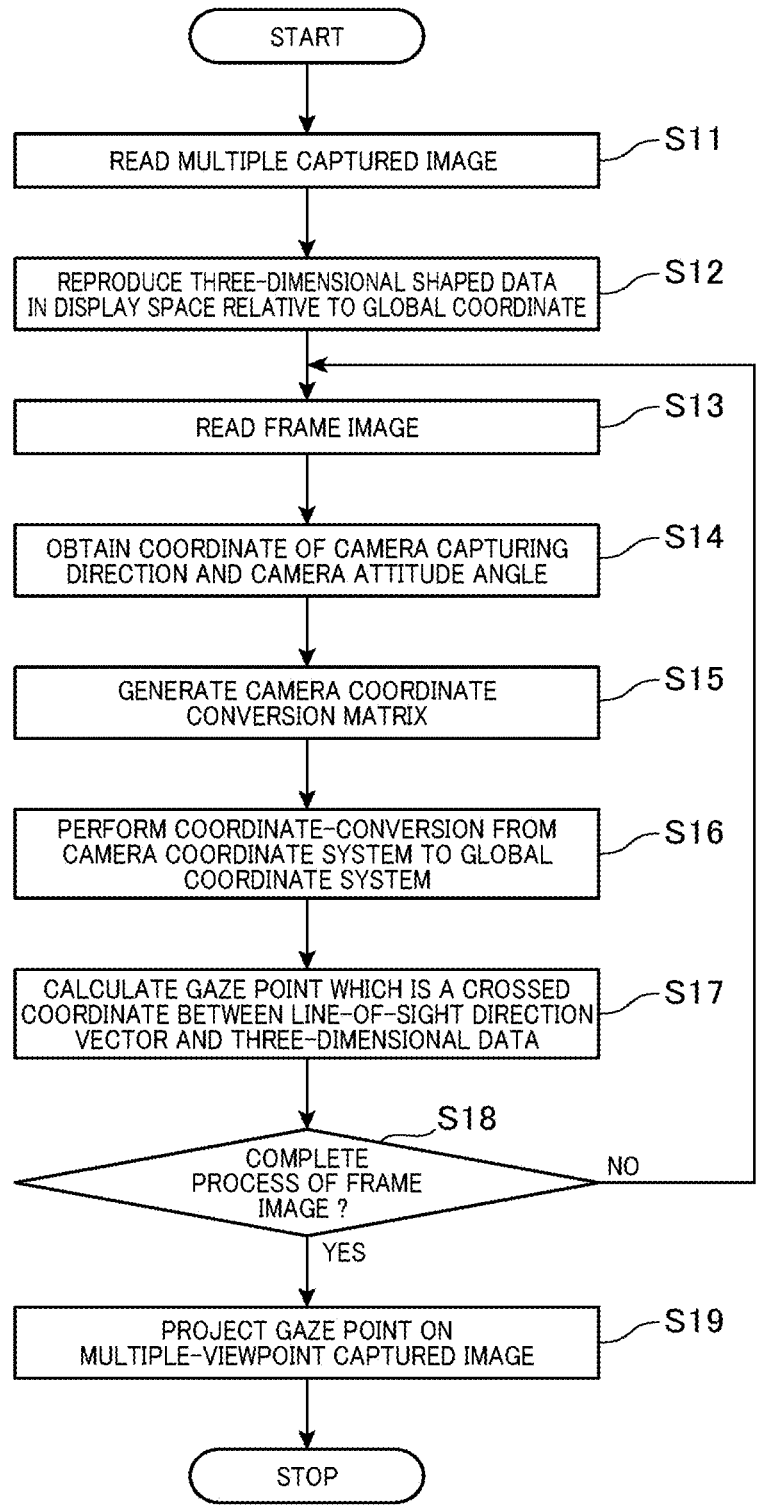

LINE-OF-SIGHT MEASUREMENT SYSTEM, LINE-OF-SIGHT MEASUREMENT METHOD AND PROGRAM THEREOF

CROSS-REFERENCE TO RELATED APPLICATIONS

The present application is a continuation of International Application No. PCT/JP2015/068522, filed Jun. 26 2015, which is based upon and claims the benefits of priority to Japanese Application No. 2014-133919, filed Jun. 30, 2014. The entire contents of these applications are incorporated herein by reference.

BACKGROUND OF THE INVENTION

Field of the Invention

The present invention relates to a line-of-sight measurement system, a line-of-sight measurement method and a program thereof.

Discussion of the Background

Line-of-sight measurement apparatuses are known. Line-of-sight measurement apparatuses detect a line-of-sight direction of an observer in a store or an exhibition place or the like, when the observer moves in a display space, observing various observation objects displayed on display racks or display stands in the display space. The line-of-sight measurement apparatus is configured to integrate a line-of-sight measurement function that detects a direction of the line-of-sight of the observer, and a visual field video camera capturing images of objects in front of the observer. The line-of-sight measurement apparatus has been practically used as a wearable-type line-of-sight measurement apparatus to be mounted on a head of an observer (e.g., refer to PTLs 1 and 2). For example, in the case of the wearable-type line-of-sight measurement apparatus, the line-of-sight measurement data obtained by the line-of-sight measurement function indicates a direction of the line-of-sight in a viewpoint coordinate system fixed relative to the head portion of the observer.

In this case, concurrently with measurement of the line-of-sight, the image of an object in front of the observer is captured by the visual field video camera which is fixed relative to the viewpoint coordinate system so as to obtain a visual field video image.

At this point, a direction of the line-of-sight indicated by the light-of-sight measurement data uniquely corresponds to an image coordinate of the visual field video image.

By using the wearable-type line-of-sight measurement apparatus, location of the observation object indicated by the line-of-sight measurement data in the viewpoint coordinate system can be displayed on the visual filed video image. Hence, with a location of the observation object displayed on the visual field video image, the measurer is able to identify a gaze point at which the observer gazes.

As a line-of-image measurement apparatus and an analysis software thereof, for example, nac Image Technology Inc. sells Eyemark Recorder EMR-9 (registered trademark) and Eyemark application software EMR-dTarget (registered trademark), respectively.

Moreover, according to a proposed method, a gaze point at which the observer gazes in the measurement space indicated by the line-of-sight measurement data is identified by combining a line-of-sight measurement function with a three-dimensional sensor measuring a location and a direction of the head of an observer in the measurement space.

PTL 1: JP-A-H06-189906

PTL 2: JP-A-2012-146199

SUMMARY OF THE INVENTION

According to one aspect of the present invention, a system of measuring a line-of-sight of an observer includes an user imaging unit which is wearable by an observer of an object in a display space and captures a field view image in front of the observer, an user measurement unit which is wearable by the observer and obtains line-of-sight measurement data showing a line-of-sight direction of the observer relative to a coordinate system of the field view image, and a line-of-sight measurement apparatus which obtains a gaze point of the observer based on a coordinate position where 3D shape data of the display space including the object intersect a vector of the line-of-sight direction of the observer.

According to another aspect of the present invention, a method of measuring a line-of-sight of an observer includes capturing a field view image in front of an observer of an object in a display space, obtaining a line-of-sight measurement data showing a line-of-sight direction of the observer relative to a coordinate of the field view image, and obtaining a gaze point of the observer based on a coordinate position at which 3D shape data of the display space including the object intersect a vector of the line-of-sight direction of the observer.

According to still another aspect of the present invention, a non-transitory computer-readable medium stored thereon a program that when executed by an information processing apparatus, causes the information processing apparatus to execute a method of measuring a line-of-sight of an observer, including capturing a field view image in front of an observer of an object in a display space, obtaining a line-of-sight measurement data showing a line-of-sight direction of the observer relative to a coordinate of the field view image, and obtaining a gaze point of the observer based on a coordinate position at which 3D shape data of the display space including the object intersect a vector of the line-of-sight direction of the observer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3A is a diagram showing a configuration example of a multiple-viewpoint captured image table among captured image tables stored in a captured data storing unit 16.

FIG. 3B is a diagram showing a configuration example of a frame image table among captured image tables stored in the captured data storing unit 16.

FIG. 4 is a diagram showing a configuration example of an extraction table stored in the captured data storing unit 16.

FIG. 6 is a flowchart showing a fixation point sampling process performed by a fixation time detection unit 12.

FIG. 7 is a flowchart showing an operation example for obtaining a gaze point at which an observer in a display space gazes relative to a global coordinate system.

DESCRIPTION OF THE EMBODIMENTS

Figure 1:
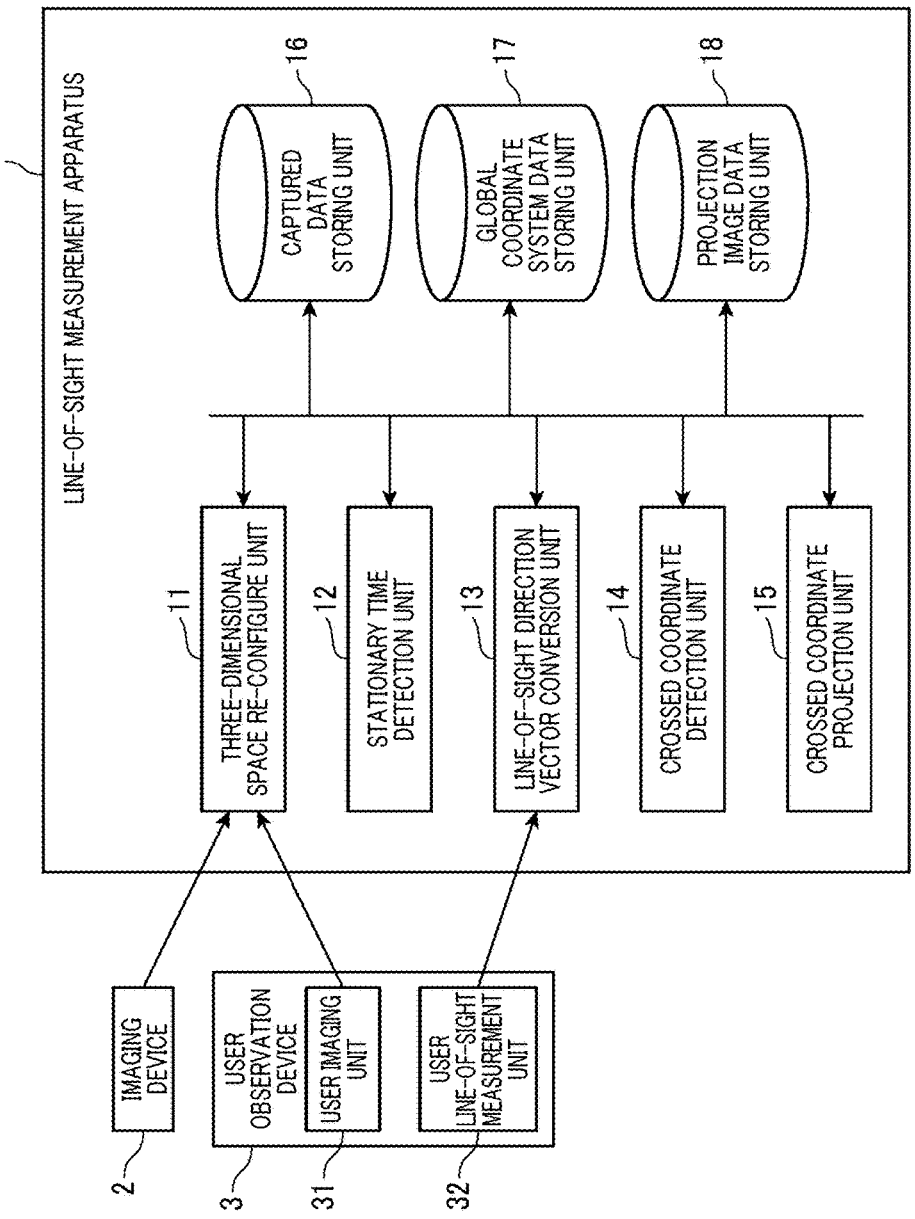
FIG. 1 is a block diagram showing a configuration example of a line-of-sight measurement system according to an embodiment of the present invention.

The embodiments will now be described with reference to the accompanying drawings, wherein like reference numerals designate corresponding or identical elements throughout the various drawings.

Hereinafter, an embodiment of the present invention will be described with reference to the drawings.

FIG. 1 is a block diagram showing a configuration example of a line-of-sight measurement system according to the present embodiment. In FIG. 1, the line-of-sight measurement system is provided with a line-of-sight measurement apparatus 1, an imaging device 2 and a user observation device 3. The line-of-sight measurement apparatus 1 is provided with a three-dimensional space reconfiguring unit 11, a fixation time detection unit 12, a line-of-sight direction vector conversion unit 13, an intersection coordinate detection unit 14, an intersection coordinate projection unit 15, a captured data storing unit 16, a global coordinate system data storing unit 17 and a projection image data storing unit 18.

The imaging device 2 is a camera including a CCD (Charge Coupled Device) or a CMOS (Complementary Metal Oxide Semiconductor) image sensor. The imaging device 2 is used to capture images including observation objects in a display space, as a multiple-viewpoint captured image captured from a plurality of different viewpoints.

The three-dimensional space reconstruction unit 11 reconstructs a display space relative to the global coordinate system, from a multiple-viewpoint captured image as a two-dimensional image obtained by capturing images of a display space from a plurality of viewpoints different from each other. Further, the three-dimensional space reconstruction unit 11 adds multiple-viewpoint captured image identification information to the multiple-viewpoint captured image which is captured by the imaging device 2. The three-dimensional space reconstruction unit 11 correlates the multiple-viewpoint captured image identification information with the multiple-viewpoint captured image, and writes and stores them into a multiple-viewpoint captured image table in the captured data storing unit 16. The three-dimensional space reconstruction unit 11, when re-configuring the three-dimensional space, correlates information obtained with each multiple-viewpoint captured image, including a feature point, a camera captured image, a camera coordinate, a camera imaging direction vector (i.e., representing attitude angle), and an image projection conversion matrix, with corresponding multiple-viewpoint captured image identification information of the multiple-viewpoint captured image, and writes and stores them into the multiple-viewpoint captured image table in the captured data storing unit 16.

The three-dimensional space reconstruction unit 11 extracts a feature point coordinate (e.g., locations where brightness is changed) which is a coordinate of the feature point. Then, the three-dimensional space reconstruction unit 11 correlates feature points between the multiple-viewpoint images captured at multiple viewpoints (i.e., matching process). According to the present embodiment, as a function of reproducing the three-dimensional space from a plurality of two-dimensional images obtained by imaging the three-dimensional space, PhotoScan (registered trade mark) manufactured by Agisoft LLC can be used, for example. In this matching process, a positional relationship between extracted feature points is used. The three-dimensional space reconstruction unit 11 calculates a three-dimensional coordinate of the feature points relative to the global coordinate system of the three-dimensional space, based on a theory of a multiple viewpoint stereo measurement, from a correspondence between the feature points.

Then, the three-dimensional space reconstruction unit 11 allocates surfaces between coordinate points arranged in the global coordinate system so as to form a polyhedron (i.e., aggregate of polygons), whereby the outer surface of the three-dimensionally shaped data to be reconstructed is formed. The data structure of the three-dimensionally shaped data may use any data format as long as the data format expresses three-dimensional data such as a point cloud data and a volume data other than an aggregate of polygons. It should be noted that the data structure of the three-dimensionally shaped data shows geometric data of a three-dimensionally shaped object including a display rack and objects (i.e., observation objects) displayed on the display rack in the display space. The three-dimensional space reconstruction unit 11 writes and stores the reconstructed three-dimensionally shaped data of the display space relative to the generated global coordinate system into the global coordinate system data storing unit 17.

The fixation time detection unit 12 detects, based on the line-of-sight measured by the user observation device 3, a fixation time during which the line-of-sight of the observer is directed to the same direction. The fixation time detection unit 12 extracts a stationary image as a frame image, from an image in which the fixation time exceeds a predetermined frame time, and adds captured image identification information thereto.

The fixation time detection unit 12 writes the frame image with the captured image identification information added thereto, into the extraction table of the captured data storing unit 16. The extraction table includes captured image identification information of the frame image, a captured image address at which the frame image indicated by the captured image identification information is stored, a line-of-sight direction vector relative to the camera coordinate system, and a capturing time indicating a time period when the frame image was captured, which are correlated with each other. The line-of-sight direction vector indicates a line-of-sight direction of the observer relative to the camera imaging coordinate of a user imaging unit 31 which will be described later, and indicates a line-of-sight direction of the observer.

The line-of-sight direction vector conversion unit 13 generates a line-of-sight direction vector relative to the camera coordinate system from line-of-sight measurement data supplied by a user line-of-sight measurement unit 32. The line-of-sight direction vector conversion unit 13 writes and stores, into the captured data storing unit 16, time information added by the user line-of-sight measurement unit 32 and a line-of-sight direction vector relative to the camera coordinate system which has been sampled with the time information.

Also, the line-of-sight direction vector conversion unit 13 converts coordinate system of a line-of-sight direction vector detected in the three-dimensional space with respect to the calculated camera coordinate system such that the camera coordinate system is converted to the global coordinate system, by using a camera coordinate conversion matrix.

According to the present embodiment, the user line-of-sight measurement unit 32 indicates the line-of-sight measurement data as a relative coordinate relative to the camera coordinate of the user imaging unit 31. However, the user line-of-sight measurement unit 32 may indicate the line-of-sight measurement data as a direction vector or an arbitrary format such as data in a measurement device.

Thereafter, three-dimensional space reconstruction unit 11 performs a matching process of the frame images in the display space relative to the global coordinate system, extracts a feature point coordinate which is a coordinate of the feature point, and calculates a camera capturing coordinate and a camera capturing direction vector.

The line-of-sight direction vector conversion unit 13 generates a camera coordinate conversion matrix with which the coordinate system of the line-of-sight direction vector is converted to the global coordinate system from the camera coordinate system, based on the camera imaging coordinate and the camera imaging direction vector. Further, the line-of-sight direction vector conversion unit 13 converts, based on the generated camera coordinate conversion matrix, the coordinate of the line-of-sight direction vector corresponding to the extracted frame images, such that the camera coordinate system is converted to the global coordinate system.

The intersection coordinate detection unit 14 reads, from the global coordinate system data storing unit 17, a shape data of the display space composed of a three-dimensionally shaped data relative to the global coordinate system. Then, the intersection coordinate detection unit 14 obtains a coordinate at which the three-dimensionally shaped data read from the global coordinate system data storing unit 17 crosses the line-of-sight direction vector relative to the global coordinate system calculated by the line-of-sight direction vector conversion unit 13. Then, the intersection coordinate detection unit 14 determines the intersection coordinate to be a gaze point at which the observer gazes, the intersection coordinate being a coordinate at which the three-dimensionally shaped data crosses the line-of-sight direction vector.

The intersection coordinate projection unit 15 reads, from the multiple-viewpoint captured image table of the captured data storing unit 16, an image projection conversion matrix which corresponds to the multiple-viewpoint captured image selected by the measurer. Subsequently, the intersection coordinate projection unit 15 plots the gaze point at which the observer gazes on the two-dimensional multiple-viewpoint captured image, using the image projection conversion matrix read by the intersection coordinate projection unit 15. The intersection coordinate projection unit 15 writes and stores the multiple-viewpoint captured image where the gaze point is plotted, to the projection image data storing unit 18, together with the multiple viewpoint captured image identification information corresponding to the multiple-viewpoint captured image where the gaze point is plotted.

According to the present embodiment, the intersection coordinate projection unit 15 plots the gaze point on the two-dimensional multiple-viewpoint captured image. However, the present invention is not limited to the present embodiment.

For example, the gaze point may be plotted on a CG image (depicted image) generated from a three-dimensionally shaped data. The gaze point may be plotted on a free viewpoint image generated from the multiple-viewpoint captured image.

It should be noted that the method of plotting a gaze point on the two-dimensional multiple-viewpoint captured image has an advantage of providing good image quality. In this regard, according to the present invention, the type of image is not limited.

The user observation device 3 can be worn by the observer. The user observation device 3 is worn by the observer when the line-of-sight measurement system is used. Where of the observer the user observation device 3 should be worn is not limited.

For example, the user observation device 3 may be attached and fixed to a head portion of the observer. In this case, in experiments to detect gaze points of the observer, the user observation device 3 is worn by the observer by fixing the device to a helmet, a headphone, or the like being put on a head portion of the observer.

Also, the user observation device 3 may be put on a portion close to an eye portion of the observer. In this case, for example, the user observation device 3 is provided to glasses or the like which covers the eye portion of the observer.

The user observation device 3 can be hung from the neck of the observer. In other words, the user observation device 3 is not necessarily fixed to the observer. In the case where the user observation device 3 is used being hung from the neck of the observer, the user observation device 3 is provided to a necklace or the like.

Since the user observation device 3 can be worn by the observer, the device may be provided on so-called wearable devices.

The user observation device 3 has a function of capturing a field view image in front of the observer. Hence, preferably, the user observation device 3 is used being worn close to the head portion or the eye portion of the observer.

The user observation device 3 is provided with a user imaging unit 31 and a user line-of-sight measurement unit 32.

The user imaging unit 31 is a video-camera including a CCD or CMOS image sensor. The user imaging unit 31 captures a motion video (image) of an area to which the face of the observer moving in the display space is oriented (area ahead of the observer). In other words, the user imaging unit 31 captures image data (field view image) of a visual field of the observer in the display space. The user imaging unit 31 is not limited to a video camera as long as an image of the visual field of the observer can be taken, but a still camera may be used. The still camera captures image data of a visual field corresponding to a 11) fixation point calculated from the light-of-sight measurement data.

The user line-of-sight measurement unit 32 is provided with a fixed eye camera fixed to the above-mentioned helmet or glasses and acquires a line-of-sight measurement data showing a line-of-sight direction of the observer in the camera coordinate system of the visual field image of the user imaging unit 31. The line-of-sight direction vector conversion unit 13 detects a line-of-sight direction vector showing a line-of-sight of the observer from the line-of-sight measurement data.

Figure 2:
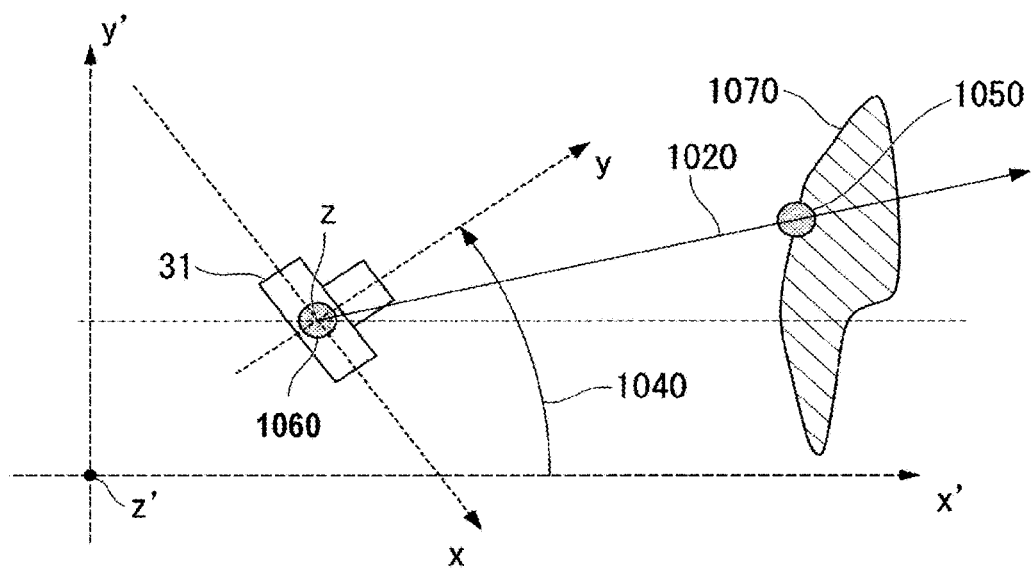
FIG. 2 is a diagram showing a process for calculating a coordinate showing a gaze point of the observer, at which a line-of-sight direction vector and a three-dimensionally shaped data cross each other.

FIG. 2 is a diagram showing a process for calculating the coordinate showing a gaze point of the observer, at which the line-of-sight direction vector crosses the three-dimensional data. FIG. 2 illustrates a global coordinate system consisting of x' axis, y' axis and z axis, and a camera coordinate system consisting of x axis, y axis and z axis. The camera capturing direction of the user imaging unit 31 is the y axis relative to the camera coordinate system. The camera imaging coordinate 1060 corresponds to a position of the user imaging unit 31 which captures the frame image, and serves as an origin of the camera coordinate system of the user imaging unit 31.

The line-of-sight direction vector 1020 is a light-of-sight direction vector of the observer calculated from the line-of-sight measurement data. The line-of-sight measurement data is measured by the user line-of-sight measurement unit 32 provided together with the user imaging unit 31, relative to the frame image captured by the user imaging unit 31. The line-of-sight direction vector conversion unit 13 performs a coordinate conversion of the line-of-sight direction vector 1020 from the camera coordinate system to the global coordinate system with the following equation (1).

$$\begin{pmatrix} x' \\ y' \\ z' \end{pmatrix} = \begin{pmatrix} \cos\alpha\cos\beta\cos\gamma - \sin\alpha\sin\gamma & -\cos\alpha\cos\beta\sin\gamma - \sin\beta\cos\gamma & \cos\alpha\sin\beta \\ \sin\alpha\cos\beta\cos\gamma - \cos\alpha\sin\gamma & -\sin\alpha\cos\beta\sin\gamma - \cos\beta\cos\gamma & \sin\alpha\sin\beta \\ -\sin\beta\cos\gamma & \sin\beta\sin\gamma & \cos\beta \end{pmatrix} \begin{pmatrix} x \\ y \\ z \end{pmatrix} \quad (1)$$

The above-equation (1) is a camera coordinate conversion matrix, where coordinate value in the camera coordinate system represented by (x, y, z) is rotated to conform to the global coordinate system represented by (x', y', z'). The attitude angle 1040 is an attitude angle of the user imaging unit 31, showing Eulerian angle of the camera coordinate system (α, β, γ) relative to the global coordinate system. The angle α represents an angle formed between the x' axis in the global coordinate system and the x axis in the camera coordinate system. The angle β represents an angle formed between the y' axis in the global coordinate system and the y axis in the camera coordinate system. The angle γ represents an angle formed between the z' axis in the global coordinate system and the z axis in the camera coordinate system.

The line-of-sight direction vector conversion unit 13 performs coordinate conversion by using the camera coordinate conversion matrix expressed in the above-equation (1) such that a line-of-sight direction vector (x1, y1, z1) relative to the camera imaging coordinate is converted to a line-of-sight direction vector (x1', y1', z1') (line-of-sight direction vector 1020) relative to the global coordinate system.

The three-dimensionally shaped data 1070 is a three-dimensionally shaped data in the display space reconstructed by the three-dimensional space reconstruction unit 11. The intersection coordinate detection unit 14 obtains a coordinate point 1050 as a gaze point of the observer. The coordinate point 1050 is a point at which a line-of-sight expressed by the line-of-sight direction vector 1020 extended from the camera imaging coordinate relative to the global coordinate system and the three-dimensionally shaped data 1070 cross each other.

The three-dimensionally shaped data 1070 is a three-dimensional data in the display space relative to the global coordinate system, which firstly crosses a line-of-sight expressed by the line-of-sight direction vector 1020 extended from the camera imaging coordinate.

Specifically, the intersection coordinate detection unit 14 detects a coordinate point of a crossing point at which a half line extending towards a direction of the line-of-sight direction vector 1020 of the observer from the camera imaging coordinate 1060, firstly crosses a three-dimensionally shaped data in the global coordinate system, thereby determining the detected crossing point as a gaze point at which the observer gazes.

FIGS. 3A and 3B each are a table showing a configuration example of a captured image table stored in the captured data storing unit 16. FIG. 3A shows a multiple-viewpoint captured image table, including a multiple-viewpoint captured image identification information, a captured image address, a feature point data, a camera imaging coordinate, a camera image direction vector, a camera attitude angle, and an image projection conversion matrix for each multiple-viewpoint captured image, which are written and stored therein. The multiple-viewpoint captured image identification information is identification information that identifies the multiple-viewpoint captured image. The captured image address indicates an address of a location where the multiple-viewpoint captured image is stored. The feature point data shows feature point such as RGB (red, green and blue) gradation degree of a multiple-viewpoint image and its coordinate. The camera captured coordinate indicates a coordinate point relative to the global coordinate system of the imaging device 2, when the multiple-viewpoint image is captured. The camera image direction vector indicates a direction to which the imaging device 2 takes images when the multiple-viewpoint captured image is captured. The camera attitude angle is an attitude angle of the imaging device 2 when the multiple-viewpoint captured image is captured. The image projection conversion matrix is used for a coordinate conversion in which the coordinate relative to the global coordinate system is projected and plotted on a multiple-viewpoint captured image.

FIG. 3B illustrates a frame image table storing, for each of frame images, captured image identification information, a captured image address, a feature point data, a camera imaging coordinate, a camera imaging direction vector, a camera attitude angle, a capturing time, and a camera coordinate conversion matrix. The captured image identification information identifies the frame image. The captured image address is an address where the frame image is stored. The feature point data shows a feature point such as RGB gradation degree of the frame image and the coordinate thereof. The camera captured coordinate shows a position of a coordinate in the global coordinate system of the user observation device 3 when an extracted frame image is captured. The camera imaging direction vector is a vector showing a capturing direction of the user observation device 3 when the extracted frame image is captured. The camera attitude angle shows an attitude angle of the user observation device 3 when the extracted frame image is captured. The capturing time is a time when imaging of the image data as being a frame data is started. The camera coordinate conversion matrix converts the coordinate of the line-of-sight direction vector relative to the camera coordinate system into the line-of-sight direction vector relative to the global coordinate system.

FIG. 4 is a diagram showing a configuration example of an extraction table stored in the captured data storing unit 16. As shown in FIG. 4, the extraction table shows correlation between the captured image identification information, the captured image address, the line-of-sight direction vector, and the capturing time. The captured image identification information identifies each of the frame images which are added to the frame image extracted by the fixation time detection unit 12 from image data of the video frame. The line-of-sight direction vector is a vector relative to the camera coordinate corresponding to time information (capturing time) of the frame image. The captured image address indicates an address of the captured data storing unit 16 where the image data of a frame image corresponding to the video frame is stored. The line-f-sight direction vector is a vector relative to the camera coordinate system corresponding to time information (capturing time) of the frame image. The capturing time indicates a time when the image data of a frame corresponding to the extracted frame image is captured.

FIGS. 5A to 5E are diagrams each showing an example of a multiple-viewpoint captured image used to reconstruct a display space captured by an imaging device 2. Each of the multiple-viewpoint captured images of FIGS. 5A to 5E configures an element of the multiple-viewpoint captured image. The three-dimensional space reconstruction unit 11 calculates respective feature point data from the multiple-viewpoint captured images and reconstructs, from the calculated feature point data, the three-dimensionally shaped data in the display space relative to the global coordinate system. In other words, the three-dimensional space reconstruction unit 11 uses principle of a multiple-viewpoint stereo measurement in accordance with a relationship between feature points of multiple-viewpoint captured image so as to calculate three-dimensional coordinate relative to the global coordinate system of a three-dimensional space of the feature points, thereby reconfiguring the three-dimensionally shaped data in the display space.

FIG. 6 is a flowchart showing an operation of a fixation point sampling process performed by the fixation time detection unit 12. The following process is performed with the line-of-sight direction vector relative to the camera coordinate system, which are sampled at intervals of a predetermined period. At this moment, the fixation time detection unit 12 accepts, from the line-of-sight direction vector conversion unit 13, a line-of-sight direction vector at each sampling time. Also, a user imaging unit 31 once writes the image data of the captured video image into the image data storing unit 16 so as to correspond to a time of time information, and then stores the image data in the image data storing unit 16. Likewise, line-of-sight direction vector conversion unit 13 once writes the line-of-sight measurement data at each sampling time into the captured data storing unit 16 to correspond to a time of the time information, and then stores the image data into the captured data storing unit 16. The image data of the video image and the line-of-sight direction vector are stored corresponding to the time of the time information.

Step S1:

The fixation time detection unit 12 reads a line-of-sight measurement data sampled at the earliest time in the order of elapsed time from the captured data storing unit 16.

Then, the fixation time detection unit 12 outputs the read line-of-sight measurement data to the line-of-sight direction vector conversion unit 13, and outputs a control signal commanding an extraction of the line-of-sight direction vector relative to the camera coordinate system.

The line-of-sight direction vector conversion unit 13 extracts the line-of-sight direction vector relative to the camera coordinate system from the supplied line-of-sight measurement data, and outputs the fixation time detection unit 12.

Step S2:

The fixation time detection unit 12 resets the fixation time measurement counter provided therein to be initialized to 0.

Step S3:

The fixation time detection unit 12 determines whether or not line-of-sight measurement data to be read next is present in the captured data storing unit 16.

At this time, the fixation time detection unit 12 advances the process to step S4 when the line-of-sight measurement data to be read next is present in the captured data storing unit 16.

On the other hand, the fixation time detection unit 12 terminates the process when the line-of-sight measurement data to be read next is not present in the captured data storing unit 16.

Step S4:

The fixation time detection unit 12 reads a line-of-sight measurement data sampled at a time subsequently to the line-of-sight direction vector currently being read.

Then, the fixation time detection unit 12 outputs the read line-of-sight measurement data to the line-of-sight direction vector conversion unit 13 so as to request extraction of the line-of-sight direction vector relative to the camera coordinate system.

The line-of-sight direction vector conversion unit 13 extracts a line-of-sight direction vector relative to the camera coordinate system from the supplied line-of-sight measurement data, and outputs the vector to the fixation time detection unit 12.

Step S5:

The fixation time detection unit 12 calculates an amount of change between the current line-of-sight direction vector and a newly calculated line-of-sight direction vector. For example, the fixation time detection unit 12 calculates an angle change from a dot product of the line-of-sight direction vectors so as to obtain a change amount ($\Delta v$).

Then, the fixation time detection unit 12 determines whether or not the change amount Δv is a predetermined threshold or more.

At this time, the fixation time detection unit 12 advances the process to step S6 when the change amount Δv is less than the predetermined threshold.

On the other hand, the fixation time detection unit 12 advances the process to step S2 when any of respective absolute values of the change amount Δv is the predetermined threshold or more.

Step S6:

The fixation time detection unit 12 increments the fixation time measurement counter (i.e., add 1). One period of the sampling time is multiplied with one count of the fixation time measurement counter to obtain a fixation time which is a time during which the line-of-sight direction vectors are pointing the same direction.

The fixation time detection unit 12 multiplies one period of the time with a count value of the fixation time measurement counter so as to obtain the fixation time as a result of the multiplication.

Step S7:

The fixation time detection unit 12 determines whether or not the obtained fixation time is the predetermined time threshold or more.

At this time, the fixation time detection unit 12 advances the process to step S8 when the obtained fixation time is the predetermined time threshold or more.

On the other hand, the fixation time detection unit 12 advances the process to step S3 when the obtained fixation time is less than the predetermined time threshold.

According to the present embodiment, the fixation time is calculated by multiplying one period of the sampling time with the count value of the fixation time measurement counter. In the present invention, it is not limited to the method described in step 7. The count value itself of the fixation time measurement counter may be used to set a count threshold, and may advance the process to step S8 when the counter value is the count threshold or more, or may advance the process to step S3 when the count value is less than the count threshold.

Step S8:

The fixation time detection unit 12 extracts, as a frame image, image data of a video frame corresponding to the first line-of-sight direction vector when the fixation time measurement counter starts counting after being reset. In the present embodiment, as the frame image, image data of the video is extracted, the image data of the video corresponding to the first line-of-sight direction vector when the fixation time measurement counter starts counting after being reset. According to the present invention, the method described in the above step 8 is not limited. The fixation time detection unit 12 may extract image data, as a frame image, corresponding to any one of line-of-sight direction vectors between the first line-of-sight direction vector when the fixation time measurement counter starts counting after being reset, and a line-of-sight direction vector when the fixation time is the count threshold or more.

Step S9:

Next, the fixation time detection unit 12 adds captured image identification information to the extracted frame image, and correlates the captured image identification information, the captured image address of the frame image, the line-of-sight direction vector, and the capturing time, and then writes and stores them into the extraction table of the captured data storing unit 16. The capturing time includes a time at which the image data is captured, the image data corresponding to the first line-of-sight direction vector when the fixation time measurement counter starts counting every time after the fixation time measurement counter is reset.

Then, the fixation time detection unit 12 advances the process to step S2.

In the case where the image data corresponds to any one of line-of-sight direction vectors between the first line-of-sight direction vector when the fixation time measurement counter starts counting after being reset, and a line-of-sight direction vector when the fixation time is the count threshold or more and extracted as the frame image, the capturing time is defined as a time when the image extracted as the frame image is captured.

FIG. 7 is a flowchart showing an operation example for obtaining a gaze point at which an observer in a display space gazes relative to a global coordinate system.

Step S11:

The three-dimensional space reconstruction unit 11 successively reads the multiple-viewpoint captured image to calculate respective feature point data. The respective feature point data are correlated to the multiple-viewpoint captured image, and then the three-dimensional space reconstruction unit 11 writes and stores them into the multiple-viewpoint image table. The three-dimensional space reconstruction unit 11 calculates feature point data for all of the multiple-viewpoint images in the multiple-viewpoint captured image table.

Step S12:

The three-dimensional space reconstruction unit 11 performs a process of reproducing (reconfiguring) the three-dimensionally shaped data in the display space relative to the global coordinate system, by using respective feature point data of the multiple-viewpoint captured image data in the multiple-viewpoint captured image table of the captured data storing unit 16.

Then, the three-dimensional space reconstruction unit 11 writes and stores reconstructed three-dimensionally shaped data in the display space relative to the global coordinate system.

At this time, the three-dimensional space reconstruction unit 11 correlates the camera imaging coordinates, the camera imaging direction vector, the attitude angle and the image projection conversion matrix of the multiple-viewpoint captured image which will be required for the reconfiguring process, to respective multiple-viewpoint captured images. Then, correlated data are written and stored into the multiple-viewpoint captured image table of the captured data storing unit 16.

Step S13:

The three-dimensional space reconstruction unit 11 successively reads the captured image address of the frame image in order of earlier captured time from the extraction table, for the frame image of the captured data storing unit 16.

Then, the three-dimensional space reconstruction unit 11 reads the image data (i.e., frame image) of the video corresponding to the captured image address so as to obtain the feature point data of the frame image.

Step 14:

The three-dimensional space reconstruction unit 11 performs a matching process between the three-dimensionally shaped data in the display space stored in the global coordinate system data storing unit 17, and the feature point data of the frame image.

Then, the three-dimensional space reconstruction unit 11 calculates, with this matching process, the camera imaging coordinate of the user imaging unit 31 in the global coordinate system at a time when the frame image is captured, the camera imaging direction vector and the attitude angle.

At this timing, the three-dimensional space reconstruction unit 11 correlates the calculated camera imaging coordinate, the camera imaging direction vector and the attitude angle to the frame image currently being processed, and writes and stores them into the frame image table of the captured data storing unit 16.

Step S15:

Next, the line-of-sight direction vector conversion unit 13 generates the camera coordinate conversion matrix expressed in the equation (1).

The camera coordinate conversion matrix is used to convert the line-of-sight direction vector to be in the global coordinate system from the camera coordinate system, using the camera imaging coordinate and the camera imaging direction vector.

The line-of-sight direction vector conversion unit 13 correlates the generated camera coordinate conversion matrix to the frame image, and writes and stores them into the frame image table.

Step S16:

The line-of-sight direction vector conversion unit 13 reads, from the extraction table of the captured data storing unit 16, the line-of-sight direction vector relative to the camera coordinate system corresponding to the frame image currently processed. The line-of-sight direction vector conversion unit 13 reads the camera coordinate conversion matrix from the frame image table, and converts the line-of-sight direction vector corresponding to the frame image which is read from the extraction table, to be in the global coordinate system from the camera coordinate system.

Then, the line-of-sight direction vector conversion unit 13 correlates the line-of-sight direction vector to the frame image, the line-of-sight direction vector being coordinate-converted into the global coordinate system, and then writes and stores them into the frame table of the captured data storing unit 16.

Step S17:

The intersection coordinate detection unit 14 reads, from the global coordinate system storing unit 17, the three-dimensionally shaped data in the display space relative to the global coordinate system.

Then, the intersection coordinate detection unit 14 extends the line-of-sight direction vector relative to the global coordinate system so as to detect an intersection coordinate of the three-dimensionally shaped data to which the line-of-sight direction vector firstly crosses.

The intersection coordinate detection unit 14 determines the detected intersection coordinate as a gaze point to which the observer in the display space gazes. Further, the intersection coordinate detection unit 14 writes and stores the coordinate of the determined gaze point into a gaze point table (not shown).

Step S18:

The three-dimensional space reconstruction unit 11 determines whether or not a frame image is present in the extraction table of the captured data storing unit 16, where the camera imaging direction vector and the attitude angle are not calculated for the frame image.

At this point, three-dimensional space reconstruction unit 11 advances the process to step S13 when the frame image is present, where the camera imaging direction vector and the attitude angle are not calculated for therefor.

On the other hand, the three-dimensional space reconstruction unit 11 advances the process to step S19, when the frame image is not present, where the camera imaging direction vector and the attitude angle are not calculated for therefor.

Step S19:

The intersection coordinate projection unit 15 reads the multiple-viewpoint captured image selected by the measurer and the image projection conversion matrix corresponding to the multiple-viewpoint captured image, from the multiple-viewpoint captured image table of the captured data storing unit 16.

Then, the intersection coordinate projection unit 15 successively reads the gaze points from the gaze point table of the captured data storing unit 16, and projects the gaze points on the corresponding multiple-viewpoint captured image.

The intersection coordinate projection unit 15 writes and stores the multiple-viewpoint captured image where the gaze points are projected into the projection image data storing unit 18.

According to the present embodiment, the display space relative to the global coordinate system is reconstructed from the multiple-viewpoint captured image. A feature point matching process is performed in the reconstructed display space, in which various data (i.e., feature point data, camera captured coordinate, camera captured direction vector, camera attitude) of the frame image table in the frame image with respect to the reconstructed display space are obtained. The present invention is not limited to the above-described processing method. The display space may be reconstructed by performing the feature point matching process by using both the multiple-viewpoint captured image and the frame image. In this case, the feature point matching process obtains various data of the frame image data in the frame image.

Figure 8A:
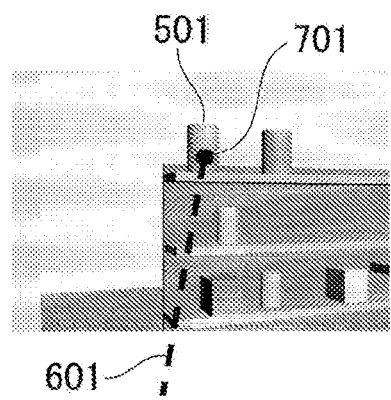
FIG. 8A is a conceptual diagram showing a process for obtaining a gaze point where a line-of-sight direction vector and a three-dimensionally shaped data cross each other.
Figure 8B:
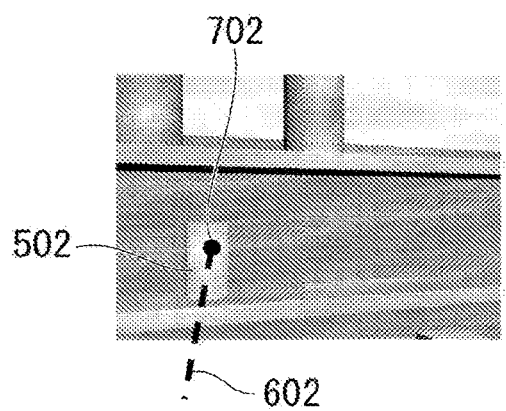
FIG. 8B is a conceptual diagram showing a process for obtaining a gaze point where a line-of-sight direction vector and a three-dimensionally shaped data cross each other.
Figure 8C:
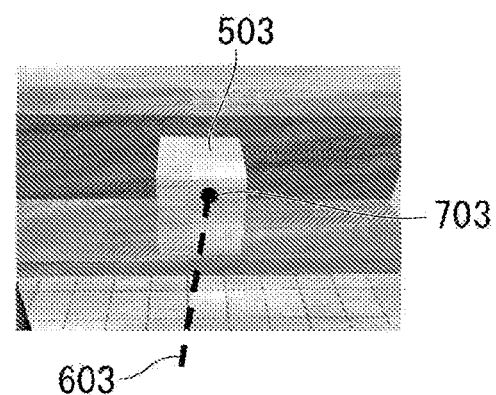
FIG. 8C is a conceptual diagram showing a process for obtaining a gaze point where a line-of-sight direction vector and three-dimensionally shaped data cross each other.

FIGS. 8A to 8C are conceptual diagrams each showing a process for obtaining a gaze point by a line-of-sight direction vector and a three-dimensionally shaped data being crossed each other.

FIG. 8A illustrates an intersection coordinate (xc1, yc1, zc1) as a gaze point 701 at which the three-dimensionally shaped data 501 in the display space relative to the global coordinate system, and the line-of-sight direction vector 601 cross each other.

FIG. 8B illustrates an intersection coordinate (xc2, yc2, zc2) as a gaze point 702 at which the three-dimensionally shaped data 502 in the display space relative to the global coordinate system, and the line-of-sight direction vector 602 cross each other.

FIG. 8C illustrates an intersection coordinate (xc3, yc3, zc3) as a gaze point 703 at which the three-dimensionally shaped data 503 in the display space relative to the global coordinate system, and the line-of-sight direction vector 603 cross each other.

FIGS. 8A to 8C illustrate an image of the same display rack captured from different directions.

Figure 9:
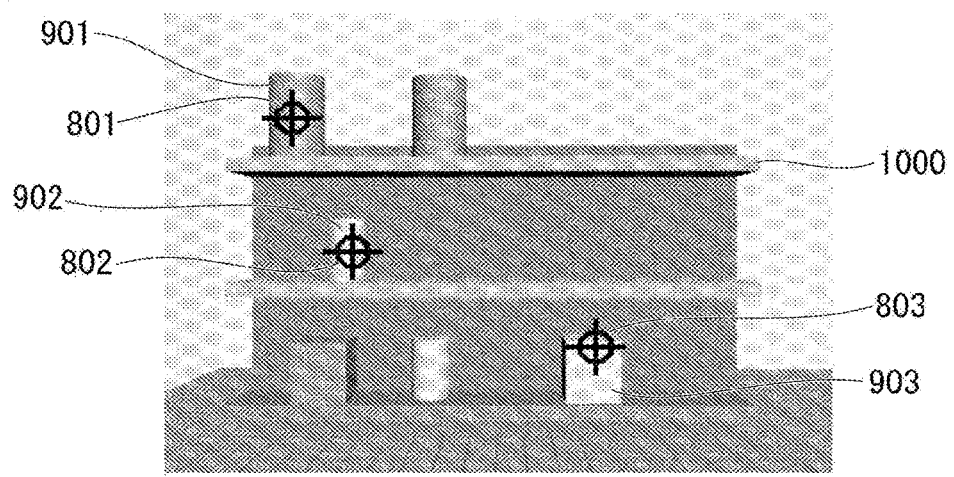
FIG. 9 is a conceptual diagram showing a multiple-viewpoint captured image where gaze points are projected, the gaze point being gazed at by the observer in a display space.

FIG. 9 is a conceptual diagram showing a multiple-viewpoint captured image where a gaze point is projected, the gaze point being gazed at by the observer in the display space.

Figure 5A:
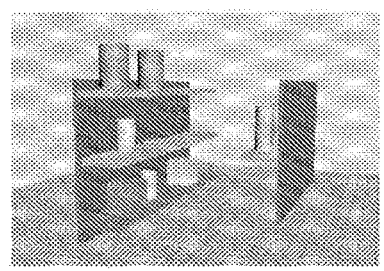
FIG. 5A is a diagram showing an example of a multiple-viewpoint captured image used to reconstruct a display space by an imaging device 2.
Figure 5B:
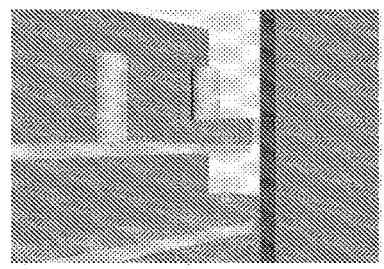
FIG. 5B is a diagram showing an example of a multiple-viewpoint captured image used to reconstruct a display space by an imaging device 2.
Figure 5C:
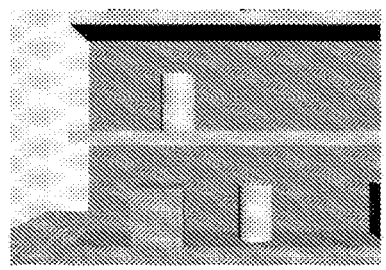
FIG. 5C is a diagram showing an example of a multiple-viewpoint captured image used to reconstruct a display space by an imaging device 2.
Figure 5D:
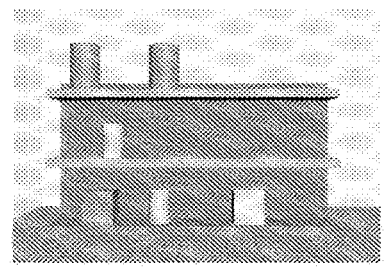
FIG. 5D is a diagram showing an example of a multiple-viewpoint captured image used to reconstruct a display space by an imaging device 2.
Figure 5E:
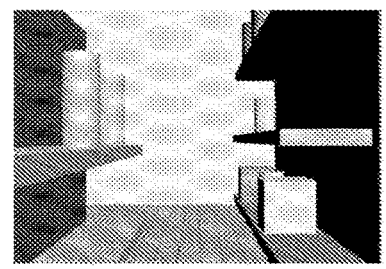
FIG. 5E is a diagram showing an example of a multiple-viewpoint captured image used to reconstruct a display space by an imaging device 2.

FIG. 9 illustrates the multiple-viewpoint captured image shown in FIG. 5D in which intersection coordinates (xc1, yc1, zc1), (xc2, yc2, zc2), (xc3, yc3, zc3) are projected, the intersection coordinates corresponding to respective three-dimensional shaped data shown in FIGS. 8A to 8C relative to three-dimensional global coordinate system.

FIG. 9 shows a display rack 1000, an image region 901, an image region 902 in which the three-dimensionally shaped data 502 is projected, and an image region 903 in which the three-dimensionally shaped data 503 is projected. A mark 801 is added in the image region 901, the mark 801 indicating a gaze point at which the intersection coordinate (xc1, yc1, zc1) is projected. Also, mark 802 is added in the image region 902, the mark 802 indicating a gaze point at which the intersection coordinate (xc2, yc2, zc2) is projected.

Figure 10:
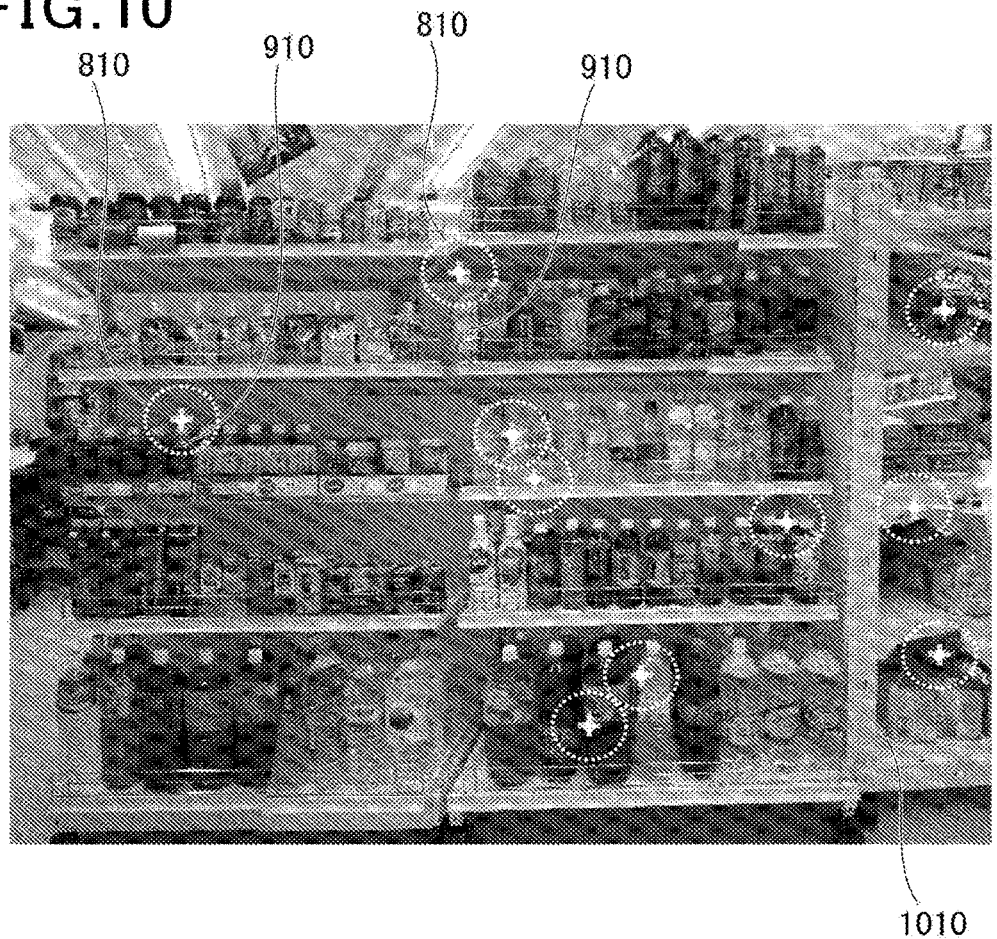
FIG. 10 is a diagram showing an example of a notification image in which gaze points are projected onto a multiple-viewpoint captured image, the gaze point being gazed by the observer in a display space.

FIG. 10 is a diagram showing an example of a notification image in which a gaze point is projected onto a multiple-viewpoint captured image, the gaze point being gazed at by the observer.

In FIG. 10, a mark 810 projecting a gaze point of the observer is drawn in an image region 910. The image region 910 is arranged in the display rack 1010 in the display space, having a drink container as an image where the three-dimensionally shaped data is projected.

Thus, the gaze points corresponding to respective image regions 910 of the drink containers can readily be detected accurately by the mark 810 which indicates the gaze point, even if the drink containers are arranged in the display rack 1010 in a complex three-dimensional shape.

As described above, according to the present embodiment, when obtaining the gaze point in the display space, three-dimensionally shaped data of the display space is reconstructed from the multiple-viewpoint captured image, obtaining an intersection coordinate at which the three-dimensionally shaped data and the line-of-sight direction of the observer are crossed each other. Accordingly, the obtained coordinated is regarded as a gaze point. Therefore, without newly adding an object to the display space, a gaze point at which the observer naturally gazes can readily be detected.

Also, according to the present embodiment, even when the objects arranged in the display space have three-dimensional complex shapes, the observer does not necessarily detect the gaze point as described, but the intersection coordinate is detected, at which the three-dimensionally shaped data and the line-of-sight direction vector indicating a direction of the line-of-sight of the observer. Hence, compared to conventional art, work load of the measurer can be reduced, and a gaze point can be detected accurately.

According to the present embodiment, since the camera imaging coordinate and the capturing time are stored in a frame image table of the captured data storing unit 16, a moving path of the observer in time series and the gaze points along the moving path can be detected easily.

Figure 11:
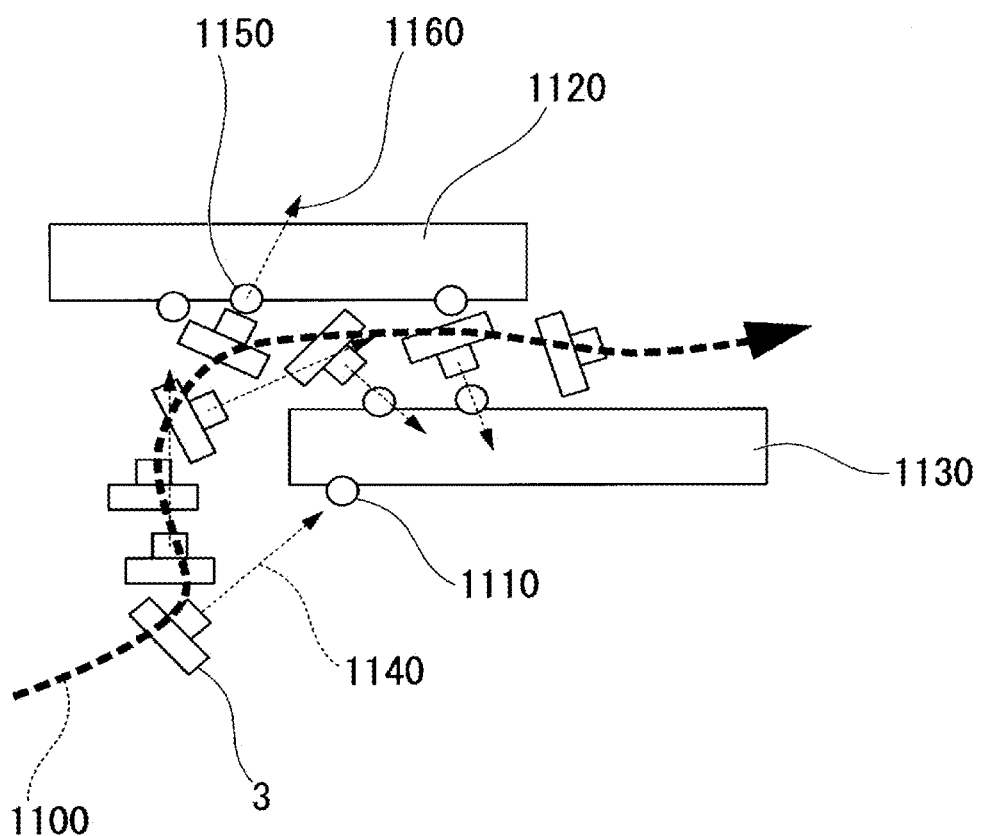
FIG. 11 is a diagram showing a display space projected to a two-dimensional coordinate of a floor plane, the display space being plotted by a gaze point to which the observer in the global coordinate system gazes.

FIG. 11 is a diagram showing a display space projected to a two-dimensional coordinate of a floor plane, the display space being plotted by a gaze point to which the observer in the global coordinate system gazes. A plot 1110 and a plot 1150 are shown, which are the gaze points of the observer with respect to the display objects in the display racks 1120 and 1130.

As shown in FIG. 11, the moving path 1100 of the user observation device 3 can be produced easily by a line-of-sight history management unit (provided in the line-of-sight measurement apparatus 1) which is not shown, which draws line segments connecting positions of camera imaging coordinate of the user observation device 3.

The line-of-sight history management unit adds arrows 1140 and 1160 showing the line-of-sight direction vectors to respective plot 1110 and plot 1150 of the gaze points, whereby the gaze point can be identified as being at any of the camera-captured locations clearly.

Specifically, in the case where the display rack has low height and when viewing another display rack over any of the display racks, or looking back at a display rack which already has been passed by the observer, the display object which has been observed can be clearly distinguished by indicating the line-of-sight direction vector.

As described above, according to the present embodiment, the moving path along which the observer moves is generated. Hence, location in the moving path, which display rack in the display racks, and exact location of the display rack to which the observer gazes can be identified.

The information of the gaze points in the moving path and the gaze points in the display racks shown in FIGS. 9 and 10 are used to clearly detect behavior of the observer, when the observer observes a display object in the display rack of the display space. As a result, arrangement for products and exhibit can be examined easily.

It should be noted that a detection process of gaze point in the line-of-sight measurement may be accomplished by executing a program having a function of the line-of-sight measurement apparatus 1. The program may be recorded into a computer readable recording medium which will be loaded into a computer system. The above-mentioned computer system includes an operating system and hardware equipment such as peripheral devices. The computer system includes a web system provided with a homepage provided environment (or display environment). The computer readable recording medium is referred to portable medium such as a floppy disk, a magneto-optic disk, ROM, CD-ROM, or memory devices such as a hard-disk integrated to a computer system. Further, the computer readable recording medium includes devices capable of storing a program for a certain period of time, for example, a volatile memory (e.g., RAM) installed in a computer system of a server or a client in the case where a program is transmitted via a communication line such as internet network or telephone network.

The above-described program may be transmitted to other computer systems from a computer system including a memory device in which the program is stored via a transmission medium or transmission waves in the transmission medium. The transmission medium that transmits program is referred to as a medium having a function of transmitting information, e.g., internet network (communication network), communication line such as telephone line (communication line). The above-described program may be configured as a part of the above-described function. Furthermore, so-called differential file (differential program) may be used, in which the above-described function is achieved by combination with an existing program recorded in the computer system.

In the case of measuring a line-of-sight relative to an object to be observed in a display space of a store or an exhibition place or the like, a summary of the gaze points of the observer are displayed on the image. For example, frequency of gazes, a moving path and the like of the observer are plotted on an image of a front-view photo of the display rack, where the observation objects are displayed in a store, or plotted on a plan view showing an arrangement of the observation objects in an exhibition place.

However, in the above-mentioned method in which the visual field video camera and the line-of-sight measurement function are combined, it is a measurer who determines to carry out the process of identifying the gaze points which the observer gazes in the display space based on the line-of-sight measurement data and a visual field video image captured by the camera. Hence, the measurer has to perform physical tasks, i.e., identifying gaze points indicated by many line-of-sight measurement data (i.e., gaze points at which the observer gazes), plotting the gaze points on the image of the above-mentioned front-view photo, generating numerical data of the gaze points which can be summed, or the like. As a result, the workload of the measurer becomes large.

According to the method disclosed by PTL 1, in the case where a three-dimensional magnetic sensor is used for the line-of-sight measurement of the observer in a large place such as a shop or an exhibition place, the entire moving range of the observer cannot be covered because of the problem of the strength of magnetic field if it is generated by a single magnetic source. To apply the method of PTL 1 to a large place such as a shop or an exhibition place, a plurality of magnetic sources are required depending on the area of the place, in which each of the magnetic sources is disposed at a position at which the moving range of the observer can be covered. Extension of the magnetic sources will involve increase in apparatus cost and work load. Moreover, the above-mentioned magnetic sources may not be disposed at appropriate locations because of physical constraint in the display space where lots of display objects are present.

Furthermore, originally, no equipment other than display objects has to be present in the display space, however, installation of the magnetic sources in several locations may visually or physically influence the observer, possibly causing a change in determination and behavior of the observer.

Alternatively, instead of using the three-dimensional magnetic sensor disclosed in PTL 1, a method using AR (Augmented Reality) markers can be used. However, in the display space where many objects are displayed, there is a concern that the AR markers cannot be arranged at appropriate locations because of physical constraints, besides the work load for arranging many AR markers. Similar to the case of the magnetic sources, arranging the AR markers which were not originally present in the display space, the observer may be visually or physically influenced thereby. Therefore, determination and behavior of the observer may be changed.

Also, according to the method disclosed by PTL 2, the display space is expressed by a single two-dimensional image acquired by a camera, and an image acquired by a visual field video camera is mapped in the display space by using a method of two-dimensional feature point matching.

However, the following problems arise when the observer moves in the display space having a complex three-dimensional structure, such as shop space where observation objects (e.g., products) are arranged three-dimensionally on a plurality of display racks.

Specifically, depending on a location or a moving direction of the observer in the display space, a two-dimensional positional relationship among the feature points in the visual field video camera or a position corresponding to occlusion may vary, or a field view of the observer may not be able to be reproduced with the two-dimensional image. Hence, according to feature points matching between the single two-dimensional image captured by the camera and a two-dimensional image of the field view video camera, locations of gaze points at which the observer gazes cannot be measured with high accuracy.

An aspect of the present invention is to provide a line-of-sight measurement system, a line-of-sight measurement method and a program thereof, with which equipment for detecting gaze points is not required to be newly installed in a display space, and if the display space arranged with observation objects has a complex three-dimensional shape, work load of the measurer is significantly reduced and a large amount of line-of-sight measurement data can be efficiently aggregated.

To solve the above-described issues, a line-of-sight measurement system according to the first aspect of the present invention includes: an user imaging unit wearable by an observer who moves in a display space displaying an object to be observed, and capturing a field view image in front of the observer; an user line-of-sight measurement unit wearable by the observer, acquiring a line-of-sight measurement data showing a line-of-sight direction of the observer relative to a coordinate system of the field view image; and a line-of-sight measurement apparatus obtaining a gaze point at which the observer in the display space gazes, in accordance with a coordinate position at which a three-dimensionally shaped data in the display space crosses a line-of-sight direction vector of the observer in the display space, the three-dimensional data including the object to be observed, and the line-of-sight direction vector being obtained from the line-of-sight measurement data.

In the line-of-sight measurement system according to the first aspect of the present invention, the line-of-sight measurement apparatus may include a three-dimensional space reconstruction unit, in which the three-dimensional space reconstruction unit reconstructs the three-dimensionally shaped data from a plurality of multiple-viewpoint captured images, the multiple-viewpoint captured image being obtained by capturing images of the display space from a plurality of different viewpoints using the field view image captured by the user imaging unit and an imaging device different from the user imaging unit.

In the line-of-sight measurement system according to the first aspect of the present invention, a three-dimensional space reconstruction unit may be provided to reconstruct a three-dimensionally shaped data based on design data of a structure included in the display space or actual measurement data obtained by measuring structure included in the display space.

In the line-of-sight measurement system according to the first aspect of the present invention, the line-of-sight measurement apparatus may include a three-dimensional space reconstruction unit; and the three-dimensional space reconstruction unit reconstructs the three-dimensionally shaped data from the field view image captured by the user imaging unit and a plurality of multiple-viewpoint captured images, the multiple-viewpoint captured image being obtained by capturing images of the display space from a plurality of different viewpoints using an imaging device different from the user imaging unit.

In the line-of-sight measurement system according to the first aspect of the present invention, the line-of-sight measurement apparatus may arrange the gaze point obtained by the line-of-sight measurement apparatus, on a depicted image generated from the three-dimensionally shaped data.

In the line-of-sight measurement system according to the first aspect of the present invention, the line-of-sight measurement apparatus may determine, when a line-of-sight direction of the observer indicated by the line-of-sight measurement data remains unchanged for a predetermined period of time, a point on the three-dimensionally shaped data crossing the line-of-sight direction to be the gaze point.

A line-of-sight measurement method according to the second aspect of the present invention includes: a process of capturing a field view image in front of an observer, by using an user imaging unit worn by the observer moving in a display space displaying an object to be observed; a process of acquiring a line-of-sight measurement data showing a line-of-sight direction of the observer relative to a coordinate of the field view image; and a process of obtaining a gaze point at which the observer in the display space gazes, in accordance with a coordinate position at which a three-dimensionally shaped data in the display space crosses a line-of-sight direction vector of the observer in the display space, the three-dimensional data including the object to be observed, and the line-of-sight direction vector being obtained from the line-of-sight measurement data.

A program according to the third aspect of the present invention enables a computer to function as a line-of-sight measurement apparatus, in which the line-of-sight measurement apparatus obtains a gaze point gazed by an observer, the observer moving in a display space that displays an object to be observed; the gaze point is obtained on the basis of a coordinate position at which a three-dimensionally shaped data of the object to be observed in the display space crosses a line-of-sight direction vector of the observer in the display space, in accordance with a field view image in front of the observer captured by a user imaging unit worn by the observer, and a line-of-sight measurement data showing a line-of-sight direction of the observer relative to a coordinate system of the field view image, the line-of-sight direction vector being obtained from the line-of-sight measurement data.

As described, according to the above-described aspects of the present invention, it is not necessary to install an additional object in the display space in order to detect gaze points in the display space, gaze points of the observer in the display space can be identified automatically, even when the display space having an object to be observed has complex three-dimensional shape. Therefore, work load of the measurer is significantly reduced and many line-of-sight measurement data can be collected effectively.

REFERENCE SIGNS LIST

1: line-of-sight measurement apparatus
2: imaging device
3: user observation device
11: three-dimensional space reconstruction unit
12: fixation time detection unit
13: line-of-sight direction vector conversion unit
14: intersection coordinate detection unit
15: intersection coordinate projection unit
16: captured data storing unit
17: global coordinate system data storing unit
18: projection image data storing unit
31: user imaging unit
32: user line-of-sight measurement unit Obviously, numerous modifications and variations of the present invention are possible in light of the above teachings. It is therefore to be understood that within the scope of the appended claims, the invention may be practiced otherwise than as specifically described herein.

What is claimed is:

1. A system for measuring a line-of-sight of an observer, comprising:
   a user imaging sensor which is wearable by an observer of an object in a display space and captures a field view image in front of the observer;
   a user measurement sensor, which is wearable by the observer and obtains line-of-sight measurement data indicating a line-of-sight direction of the observer relative to a coordinate system of the field view image; and
   processing circuitry configured to obtain, from the line-of-sight measurement data, a gaze point of the observer based on a coordinate position in a coordinate system of the user measurement sensor at which 3D shape data of the display space, including the object, intersects with a vector, corresponding to the line-of-sight direction of the observer, generated based on correlating the coordinate system of the field view image and the coordinate system of the user measurement sensor,
   wherein the correlating the coordinate system of the field view image and the coordinate system of the user measurement sensor includes applying coordinate conversion of a line-of-sight direction vector from a camera coordinate system to a global coordinate system with a camera coordinate conversion matrix, where a coordinate value in the camera coordinate system represented by (x, y, z) is rotated to conform to the global coordinate system represented by (x', y', z').

2. The system of claim 1, wherein the processing circuitry configured to reconstruct the 3D shape data from a plurality of multi-viewpoint capture images obtained by an imaging device, which is different from the user imaging sensor and captures images of the display space from different viewpoints.

3. The system of claim 1, wherein the processing circuitry configured to reconstruct the 3D shape data from the field view image captured by the user imaging sensor and a plurality of multi-viewpoint capture images obtained by an imaging device, which is different from the user imaging sensor and captures images of the display space from different viewpoints.

4. The system of claim 1, wherein the processing circuitry is further configured to place the obtained gaze point on one of the multi-viewpoint capture images in the display space.

5. The system of claim 2, wherein the processing circuitry is further configured to place the obtained gaze point on one of the multi-viewpoint capture images in the display space.

6. The system of claim 3, wherein the processing circuitry is further configured to place the obtained gaze point on one of the multi-viewpoint capture images in the display space.

7. The system of claim 1, wherein the processing circuitry is further configured to place the obtained gaze point on a depicted image generated from the 3D shape data.

8. The system of claim 2, wherein the processing circuitry is further configured to place the obtained gaze point on a depicted image generated from the 3D shape data.

9. The system of claim 3, wherein the processing circuitry is further configured to place the obtained gaze point on a depicted image generated from the 3D shape data.

10. The system of claim 4, wherein the processing circuitry is further configured to place the obtained gaze point on a depicted image generated from the 3D shape data.

11. The system of claim 1, wherein when the line-of-sight direction of the observer remains fixed for a period of time the processing circuitry is further configured to determine a point on the 3D shape data which intersects the line-of-sight direction as the gaze point.

12. The system of claim 2, wherein when the line-of-sight direction of the observer remains fixed for a period of time, the processing circuitry is further configured to determine a point on the 3D shape data which intersects the line-of-sight direction as the gaze point.

13. The system of claim 3, wherein when the line-of-sight direction of the observer remains fixed for a period of time, the processing circuitry is further configured to determine a point on the 3D shape data which intersects the line-of-sight direction as the gaze point.

14. The system of claim 4, wherein when the line-of-sight direction of the observer remains fixed for a period of time, the processing circuitry is further configured to determine a point on the 3D shape data which intersects the line-of-sight direction as the gaze point.

15. A method of measuring a line-of-sight of an observer, comprising:

capturing a field view image in front of an observer of an object in a display space by a user imaging sensor;

obtaining a line-of-sight measurement data indicating a line-of-sight direction of the observer relative to a coordinate of the field view image; and obtaining, from the line-of-sight measurement data, a gaze point of the observer based on a coordinate position in a coordinate system of the user measurement sensor at which 3D shape data of the display space, including the object, intersects with a vector, corresponding to the line-of-sight direction of the observer, generated based on correlating the coordinate system of the field view image and the coordinate system of the user measurement sensor, wherein the correlating the coordinate system of the field view image and the coordinate system of the user measurement sensor includes applying coordinate conversion of a line-of-sight direction vector from a camera coordinate system to a global coordinate system with a camera coordinate conversion matrix, where a coordinate value in the camera coordinate system represented by (x, y, z) is rotated to conform to the global coordinate system represented by (x', y', z').

16. A non-transitory computer-readable medium stored thereon a program that when executed by an information processing apparatus, causes the information processing apparatus to execute a method of measuring a line-of-sight of an observer, comprising:

capturing a field view image in front of an observer of an object in a display space by a user imaging sensor;

obtaining a line-of-sight measurement data indicating a line-of-sight direction of the observer relative to a coordinate of the field view image; and obtaining, from the line-of-sight measurement data, a gaze point of the observer based on a coordinate position in a coordinate system of the user measurement sensor at which 3D shape data of the display space, including the object, intersects with a vector, corresponding to the line-of-sight direction of the observer, generated based on correlating the coordinate system of the field view image and the coordinate system of the user measurement sensor, wherein the correlating the coordinate system of the field view image and the coordinate system of the user measurement sensor includes applying coordinate conversion of a line-of-sight direction vector from a camera coordinate system to a global coordinate system with a camera coordinate conversion matrix, where a coordinate value in the camera coordinate system represented by (x, y, z) is rotated to conform to the global coordinate system represented by (x', y', z').

* * * * *